Jan. 7, 1964  A. G. DRAEGER ETAL  3,117,161
PREPARATION OF NITROSODIMETHYLAMINE
Filed Feb. 8, 1960
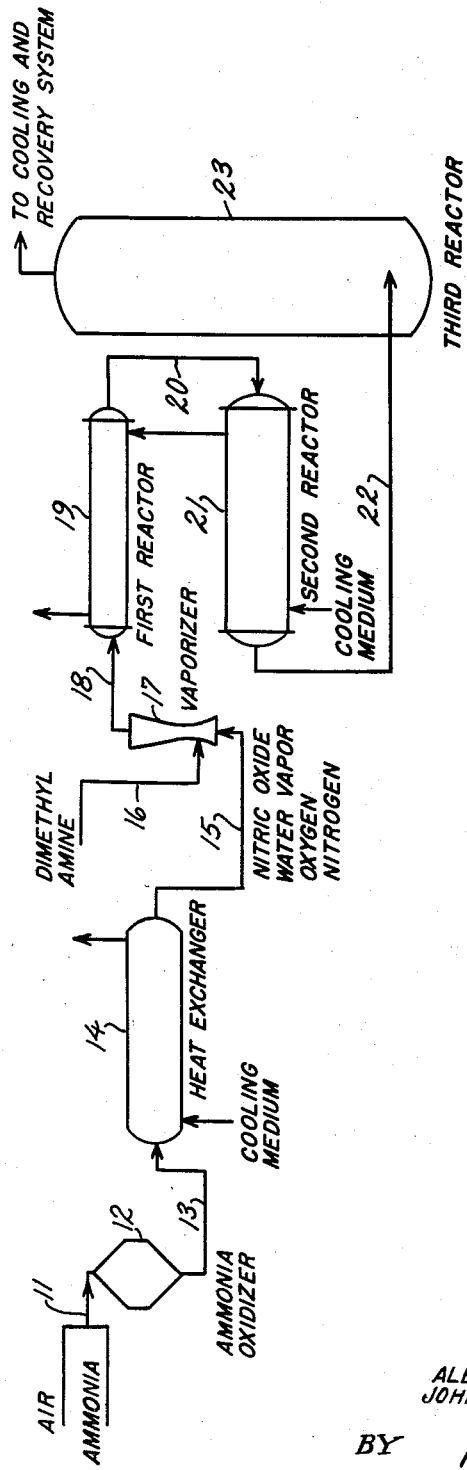
INVENTORS
ALBERTUS G. DRAEGER
JOHN W. GETZ
BY Pauline Newman
ATTORNEY

3,117,161
PREPARATION OF NITROSODIMETHYLAMINE
Albertus G. Draeger, St. Albans, W. Va., and John W. Getz, Baltimore, Md., assignors to FMC Corporation, a corporation of Delaware
Filed Feb. 8, 1960, Ser. No. 7,188
3 Claims. (Cl. 260—583)

This invention relates to the preparation of N-nitrosodimethylamine by the vapor phase reaction of dimethylamine with a mixture of nitric oxide and oxygen under acid conditions.

Nitrosodimethylamine is an intermediate in the production of N,N-dimethylhydrazine, which in recent years has found use as a rocket fuel. The process which has been most frequently described for the production of nitrosamines involves the treatment of secondary amines with sodium nitrite and an acid. For commercial use, however, this process has the disadvantage that the cost of sodium nitrite and acid adds appreciably to the cost of the product, and further that the product must be separated from a relatively large volume of water containing sodium sulfate or other salts.

Another process which has been proposed and which is more economical with respect to raw materials cost, provided high yields can be obtained, involves the nitrosation of dialkylamines with nitrogen trioxide ($N_2O_3$) or an equivalent mixture of nitrogen dioxide and nitric oxide. This reaction is desirable carried out in the vapor phase, since the gaseous reactants are not readily absorbed in an aqueous reaction medium, and the use of organic solvents for the reactants is expensive.

The chief difficulty encountered in the vapor phase nitrosation of dimethylamine with nitrogen trioxide results from the fact that the reaction is very rapid and strongly exothermic. Consequently, when the reactants are mixed, the temperature rises sharply with the result that by-product formation and decomposition occur, and a low yield of the desired nitroso compound is obtained. The reaction is so rapid that it is extremely difficult to remove any substantial part of the heat during the reaction and thereby prevent the sharp temperature rise. The reaction can be controlled in the laboratory where low flow rates are employed and cooling is a simple matter. However, in commercial plant operations, where it is more difficult to control such exothermic vapor phase reactions, this process does not produce the nitrosidialkylamine in satisfactory yields.

It has also been proposed to nitrosate dialkylamines by reacting nitric oxide and oxygen with an excess of the dialkylamine. This excess is necessary to maintain alkaline conditions which avoid the formation of nitric acid, the expected product of the oxidation of nitric oxide under nonalkaline conditions. Any nitric acid formed during the reaction will react with the dialkylamine to form the dialkylammonium nitrate rather than the desired nitrosodialkylamine. Although the proposed method does in fact avoid the formation of nitric acid, the resulting product is a mixture of the nitrosodialkylamine and the dialkylammonium nitrite. An additional process step is required to convert the dialkylammonium nitrite into the desired nitrosamine.

We have now discovered that dimethylamine may be directly nitrosated by a process which produces the desired nitrosamine in excellent yields, without the formation of any intermediate dialkylammonium nitrite or nitrate, and which at the same time provides a vapor phase reaction which is readily controlled, even when carried out on a large scale. These highly desirable results are obtained, briefly, by conducting a vapor phase nitrosation of dimethylamine with nitric oxide and oxygen at a pH of less than 7, under which conditions we have surprisingly found that not only is the prior art formation of dimethylammonium nitrite avoided, but substantially no dimethylammonium nitrate is formed. Moreover, this reaction is readily controlled to provide excellent yields of nitrosodimethylamine in large scale operations, as opposed to the prior art reaction with nitrogen trioxide, which is difficult to control and does not produce satisfactory yields in commercial operations. The reaction involved in the preparation of nitrosodimethylamine by the present process may be represented by the equation:

$$4NO + O_2 + 4(CH_3)_2NH \xrightarrow{acid} 4(CH_3)_2N-NO + 2H_2O$$

The acid conditions necessary herein are suitably provided by using a stoichiometric excess of nitric oxide in the range of about 5 to 25 percent, an excess of 10 to 15 percent being preferred. The acid conditions may also be provided by adding to the reaction mixture a small amount of an acid stronger than nitrous acid, such as hydrochloric, sulfuric, or phosphoric acid. It is preferred, however, to use an excess of nitric oxide to provide the acid conditions since this avoids the introduction of an additional contaminant of the product. Also, an excess of nitric oxide insures the utilization of all the dimethylamine, and this is desirable since the latter is the more expensive of the starting materials. The amount of acid or excess of nitric oxide employed should be such that the condensed reaction product will have a pH in the range of about 1 to less than 7, preferably from 2 to 5.

The nitrosation reaction mixture should contain at least the stoichiometric proportion of one mole of oxygen for each four moles of the amine, and preferably should contain at least a 10 percent excess over this amount.

While the reaction mixture may be formed by mixing pure nitric oxide, dimethylamine, and oxygen or air, it is more economically prepared by oxidizing ammonia in an excess of air and mixing the ammonia oxidation product with the amine. The oxidation of ammonia to produce the desired mixture of nitric oxide and air may be represented by the following equation:

$$4NH_3 + 6O_2 \rightarrow 4NO + O_2 + 6H_2O$$

The oxidation of ammonia is usually carried out by passing a mixture of ammonia and air over a platinum catalyst at high temperature and moderate pressure. The mixture of ammonia and air is suitably provided by a mixture containing 8 to 13 percent by volume ammonia and the balance air. Preferably a mixture of 10 percent ammonia and 90 percent air is used, since this provides a slight excess of oxygen during the nitrosation reaction. Mixtures containing less than about 8 percent ammonia increase the difficulty of recovering the product, with little if any compensating advantage. The oxidation product mixture is cooled preferably to approximately the temperature at which the nitrosation reaction is to be carried out and is mixed with the amine before any substantial further oxidation of the nitric oxide takes place. It is unnecessary to remove water vapor from the ammonia oxidation product, and in fact it is desirable not to cool to such an extent that water vapor condenses out. Preferably the ammonia oxidation product is cooled to a temperature of 80 to 200° C.

Either anhydrous or aqueous dimethylamine may be used in the process. A 40 percent aqueous solution is commercially available and has been found to be suitable for use when pure nitric oxide and oxygen or air are employed. When an ammonia oxidation product, which contains water vapor, is used as the source of nitric oxide, anhydrous dimethylamine is preferred. The amine is vaporized and heated to approximately the temperature at which the reaction is to be carried out.

The reaction may be carried out at temperatures between about 7° C. (the approximate boiling point of dimethylamine) and about 200° C. At higher temperatures a significant decrease in yield is observed, due to side reactions and decomposition. A liquid phase, in the form of fog, appears at temperatures below about 100° C., however it has no apparent effect upon the progress of the reaction. At temperatures below about 60° C., slight amounts of nitric acid are formed, which leads to the formation of some dimethylamine nitrate. Temperatures in the range of 60° C. to 175° C. give good results and are easily maintained.

The reaction may be carried out at atmospheric pressure or at higher or lower pressures. Pressures slightly above atmospheric which are sufficient to force the gases through the reaction and recovery equipment are preferred. Pressures in the range of 10 to 50 p.s.i.g. are suitable.

The reaction may be carried out in any effective apparatus. It is convenient to run the reaction in a series of tubes, adapted for temperature control. For example, the gaseous reactants may be passed through a series of tubes in a heat exchanger; or alternatively, the reaction gases may be passed over the exterior of the tubes and the cooling medium through the interior; the reactor may consist of relatively narrow passageways with parallel walls, the exterior wall surfaces being subjected to cooling. The final stages of the reaction may be run without special provision for cooling. The total volume of the reaction space should be sufficient to provide time for the nitrosation reaction to go substantially to completion. The time will vary with such factors as temperature and pressure, but in general the total reactor volume should be such as to provide a retention or residence time of about 1 to 20 seconds.

The accompanying drawing illustrates a preferred embodiment of the process. Air and ammonia are mixed and passed through line 11 into an oxidizer 12 containing a platinum catalyst. The oxidation converts the ammonia to nitric oxide and water, and the liberated heat of reaction raises the temperature of the gases normally to approximately 1000° C. The reaction gases pass through line 13 to one or more heat exchangers, illustrated at 14, which may include a preheater for the air-ammonia mixture and also a waste-heat boiler. These cooling devices serve to reduce the temperature to approximately 250° C.

Dimethylamine is fed through line 16 to vaporizer 17, where it is vaporized and mixed with the ammonia oxidation gases entering through line 15. The mixture then passes through line 18 to reactor 19, which is equipped with external cooling means to remove the heat of reaction as produced. From reactor 19 the gases pass through line 20 to the second reactor 21, which has greater reaction volume than reactor 19. Water or other cooling fluid is circulated over the exterior surfaces of the tubes in both reactors.

From reactor 21 the gases pass through line 22 into the third reactor 23, which is preferably a tank-type reactor of larger volume than reactors 19 and 21, to provide the retention time necessary to complete the reaction. After the gases leave reactor 23 they are cooled to condense substantially all of the nitrosodimethylamine and water, which are separated from the uncondensed gases. The liquid product may be purified by distillation and drying.

The following examples illustrate specific embodiments of the invention, however the invention is not limited thereto.

*Example 1*

In the equipment illustrated in the drawing, ammonia oxidation gases having the approximate composition of 9.7 mole percent nitric oxide, 5.7 percent oxygen, 15.6 percent water vapor, and 69 percent nitrogen were fed under a pressure of 30 p.s.i.g. and a temperature of 260° C. to the vaporizer, together with dimethylamine. The quantity of nitric oxide contained in the ammonia oxidation gases corresponded to an excess of about 11 percent over the stoichiometric amount needed to react with the dimethylaminne present. Vaporization of the amine reduced the temperature of the mixture to 165° C. and the mixture was passed through the reactor system. Cooling water was passed over the first two reactors in countercurrent relationship to the flow of the reacting gases. The gases leaving the third reactor were under a pressure of 26 p.s.i.g. and at a temperature of 177° C. The reaction gases were cooled to 10° C. to form a liquid condensate having a composition of 58.9 weight percent nitrosodimethylamine, 33.7 percent water, 5.5 percent dimethylamine nitrate, and 1.9 percent nitric acid. The condensate was treated with a slight excess of sodium hydroxide solution, thereby converting the nitric acid to sodium nitrate and the dimethylamine nitrate to dimethylamine and sodium nitrate. The treated condensate was first distilled to remove the low boiling dimethylamine, and then further distilled to remove a mixture of nitrosodimethylamine and water.

*Example 2*

A reactor system was constructed consisting of four 3-foot long glass tubes arranged in series, the inside diameters of the tubes being 0.51, 0.79, 1.42 and 2.21 inches, respectively. The first three tubes were provided with jackets through which a heat exchange liquid was passed to provide cooling, while the fourth tube was air cooled. Twenty and one tenth moles per hour of air, 1.84 moles of nitric oxide and 1.6 moles of dimethylamine were heated separately to a temperature of 98° C. and passed through the reactor system at substantially atmospheric pressure. The temperature at the end of each tube was 98° C., 94° C., 97° C. and 57° C., respectively. Nitrosodimethylamine was recovered by passing the product gases sequentially through a glass-wool packed column to eliminate fog, a separator where most of the product separated out, and finally through a Dry-Ice trap. The condensed product has a pH of 4 and the yield of nitrosodimethylamine was 98.8 percent of theoretical. This mixture contained approximately 60 weight percent nitrosodimethylamine.

While the principle of this invention has been explained and exemplified in such manner that it can be readily understood and practiced by those skilled in the art, it will be understood that various modifications and changes may be made from the specific illustrations and examples given in the present specification without departing from the spirit of the invention or the scope of the following claims.

We claim:

1. A process for the production of nitrosodimethylamine which comprises reacting in vapor phase no more than a stoichiometric quantity of dimethylamine with at least stoichiometric quantities of nitric oxide and oxygen, maintaining acidic conditions throughout the reaction so that the condensed reaction products have a pH in the range of 1 to less than 7, removing heat of reaction from the gaseous reaction mixture to maintain the temperature between 7° and 200° C., and recovering nitrosodimethylamine from the reaction products substantially free of dimethylammonium nitrite.

2. The process of claim 1 in which the acidic condition is maintained by adding an excess of nitric oxide over the stoichiometric amount.

3. The process of claim 1 in which the acidic condition is maintained by adding an acid which is stronger than nitrous acid to the reaction mixture.

4. The process of claim 3 in which the added acid is hydrochloric acid.

5. A process for the production of nitrosodimethylamine which comprises reacting nitric oxide, oxygen, and dimethylamine in the vapor phase, said oxygen and dimethylamine being present in stoichiometric amounts relative to each other and said nitric oxide being present in a 5 to 25 percent excess over the stoichiometric amount required for reaction with the dimethylamine, removing the heat of reaction from the gaseous reaction mixture to maintain the temperature between 7° C. and 200° C., and recovering nitrosodimethylamine from the reaction mixture substantially free of dimethylammonium nitrite.

6. The process of claim 5 in which the temperature is maintained between 60° C. and 175° C.

7. The process of claim 5 in which the gaseous reaction mixture contains nitric oxide in a 10 to 15 percent excess over the stoichiometric amount.

8. The process of claim 1 in which the condensed reaction products have a pH of from about 2 to 5.

References Cited in the file of this patent

FOREIGN PATENTS

| | | |
|---|---|---|
| 541,485 | Italy | Apr. 3, 1956 |
| (Equivalent of Canadian Patent 553,523) | | |
| 772,331 | Great Britain | Apr. 10, 1957 |
| 789,702 | Great Britain | Jan. 29, 1958 |

OTHER REFERENCES

Mellor: Modern Inorganic Chemistry, pp. 417, 429 (1952).